Sept. 29, 1964 C. P. GUNSON 3,151,063
AEROBIC PROCESS FOR STABILIZATION OF SEWAGE SLUDGE
Filed Jan. 6, 1960
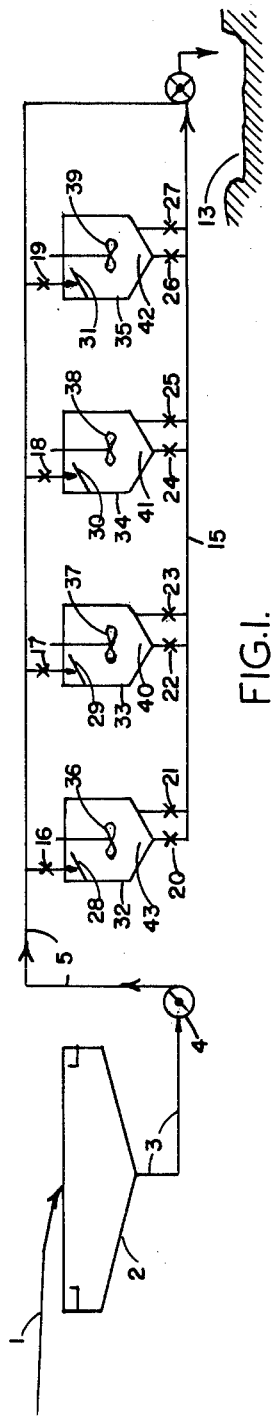
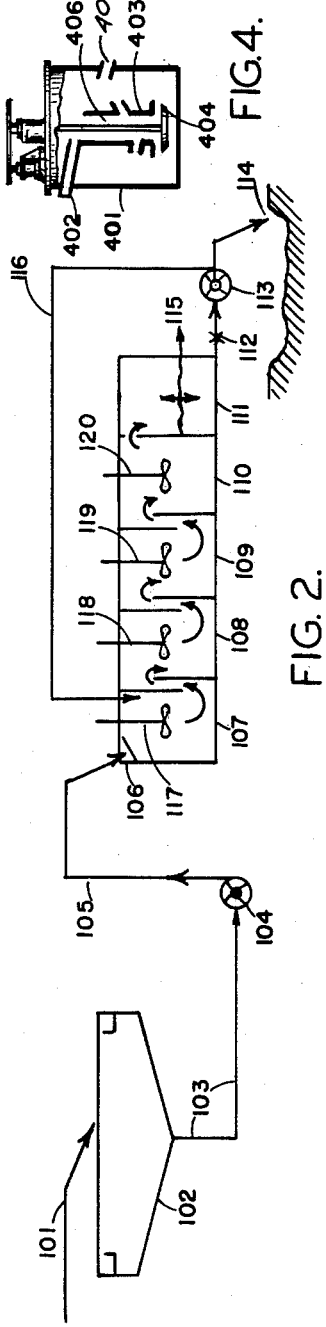
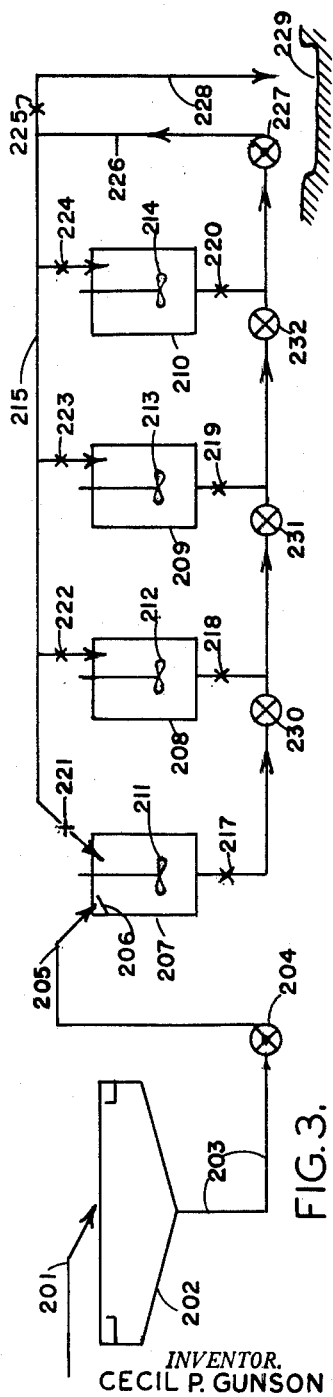
INVENTOR.
CECIL P. GUNSON
BY
McGrew and Edwards
ATTORNEYS

United States Patent Office 3,151,063
Patented Sept. 29, 1964

3,151,063
AEROBIC PROCESS FOR STABILIZATION OF
SEWAGE SLUDGE
Cecil P. Gunson, Denver, Colo., assignor to Denver
Equipment Company, Denver, Colo., a corporation of Colorado
Filed Jan. 6, 1960, Ser. No. 861
8 Claims. (Cl. 210—7)

My invention relates to the treatment of sewage and other organic waste products and more particularly to an aerobic process and system for stabilization of such sludge for useful and easy disposition.

In the art of sewage treatment, one of the most important and difficult operations in the overall process is the eventual disposal of the sewage sludge. "Sewage sludge" here refers to the organic and inorganic solids removed from sewage.

The solid sludge mass, if not stabilized, will create a nuisance and a health hazard and, therefore, some easy and economical method of stabilization of the solids has required solution. The instant invention is a successful solution to that problem.

As mentioned above, such a sludge consists of the various organic and inorganic solids normally found in sewage and other waste products, plus a water vehicle. The sewage and other organic waste products contain many bacteria which can be generally defined as facultative, anaerobic and aerobic bacteria. This includes, of course, all of the pathogenic bacteria disposed of in the waste of the human body. If such sludge is not stabilized, the bacteria will increase, the solids will be broken down, and offensive odors will be produced thereby causing a nuisance and health hazard. Packing house wastes, dairy plant wastes, soap works and cheese processing plants also produce organic waste products which may be treated effectively by the present invention.

The foul odor which results from the breakdown of sludge is usually spoken of as decay, which may be defined simply as the process in which the proteins and other compounds normally occurring in sewage and other organic waste products are oxidized to stable compounds devoid of foul odors. This oxidation process is called aerobic digestion. On the other hand, when decomposition takes place under anaerobic conditions, the process is termed "putrifaction," which may be defined as a reaction in which the proteins and other compounds are incompletely oxidized to unstable or foul-smelling compounds (for example, mercaptans, amines, fatty acids, indole and hydrogen sulfides).

Prior to the instant invention various methods have been used for sludge disposal such as: the removal of free moisture by vacuum filtration and then sterilization of the sludge at high temperatures thereby removing the balance of the moisture; burning the sludge to rid the mass of organic matter; dumping at sea or burying; and anaerobic methods, i.e., a process carried out in an absence of oxygen by promotion of action of minute organisms, especially those of the bacteria group which do not require air or free oxygen to maintain life.

The first method above-mentioned, namely, the filtration and sterilization method, is very expensive in that large quantities of chemicals are required to coagulate the raw sludge in order that vacuum filters will be able to treat the sludge solids as well as elaborate and expensive apparatus to accomplish the sterilization.

Referring to the last method above-mentioned, namely, the anaerobic method, large storage spaces are necessary in order to maintain the sludge mass for a detention time of from twenty-five to thirty-five days. In addition to the storage capacity, it is necessary to maintain a sludge temperature from about 85 to 100° F. at all times in order to support proper bacterial environment. The cost of constructing tanks great enough to fill the above requirements is obviously very large. In addition to this, there are high operational costs and it is necessary to provide boilers to aid in maintaining the required temperature. Further, extensive pumping equipment is required for proper mixing of the contents of the tanks. Also, the various factors of air or oxygen evacuation, temperature, seeding on the rate of decomposition and hydrogen ion concentration are all factors which must be closely watched and religiously controlled.

The other methods of the prior art such as burning, burying and dumping at sea are expensive, noxious and unsatisfactory from the health viewpoint.

The instant process is a radical and new departure from such prior art processes in that the necessity of large vacuum filters, sterilization means, elaborate storage spaces and equipment, careful temperature control, chemical reactants, air and oxygen evacuation and extensive pumping equipment are of no import, need not be carefully controlled, or are not necessary for the proper operation of the process. Furthermore, proper pH control is an inherent result of the operating procedure of this invention and needs no control.

As was noted above, the instant process is directed towards an aerobic process and is a departure from the prior art methods, particularly in that the process may be operated at almost any temperature desired above actual freezing of the sludge mass, as for example, ambient air temperature.

Further, air or some other available oxygen-containing fluid is used in the instant process, thus obviating the necessity of the expensive and elaborate apparatus necessary for the exclusion of air or oxygen.

Generally, the theory of the instant process is as follows:

The raw sewage or other waste products are clarified and the settled sludge removed. Thereafter, the sludge is broken up into small discrete particles. In doing this, the surface area of the particles is greatly increased, thereby lending greater surface activity and removing previously oxidized matter. During the particle disintegration, air is introduced under pressure substantially as the solids are being agitated, further enhancing the scrubbing of oxidized material that may have developed on the particle surfaces while at the same time forcing oxygen into the pores of and into close association with the sludge particles, thereby speeding up the desirable oxidation of the noxious odor producing proteins and other compounds present in the sludge. Relatively simultaneous with the agitation and aeration, a seeding with about 2% by volume of previously stabilized sludge is accomplished which functions as a catalyst for the reactions proceeding in the sludge mass. While this is a preferred percentage, lesser amounts may be used, although this may result in a slower initial reaction rate.

After as much oxygen as possible is forced into the surrounding liquid and into close association with the sludge solids, agitation and aeration are stopped. The sludge mass is then allowed to remain quiescent for a period of time normally approximately one hour, the exact time being dependent upon the temperature.

During the quiescent period the oxidation process proceeds; the oxygen is exhausted; and the sludge solids become oxygen-hungry again.

As the above oxidation proceeds, $CO_2$ gas is produced and is absorbed by the liquid. Aerobic bacteria thrive in a $CO_2$ saturated solution, and, as this type of bacteria develop, the oxidation processes proceed more rapidly.

The above process of supplying oxygen to the oxygen-hungry sludge while agitating is thereafter repeated until the protein matter and other compounds in the sludge are oxidized to a desired stable condition.

It has been found that the agitation and aeration need not be simultaneous as intermittent operation accomplishes the desired results.

After the above has been accomplished, as indicated by bacteria count and desired oxidation of the proteins and other compounds, the resulting stabilized sludge is passed off to a conventional filtering, surge tank or other apparatus, and drying and/or sludge beds. In addition this invention can be used to supplement and greatly increase present anaerobic digestion systems capacities by placing them in the system prior to anaerobic digestion.

It is important to note that no rigid control of temperature, alkalinity or hydrogen ion concentration is necessary. In fact, it has been discovered that if abnormal pH conditions are induced by new sludge masses having such characteristics; that the process is self-sustaining in that the reacting mass absorbs such condition and, of itself, returns to optimum operating conditions.

In actual tests run in a large metropolitan area, sludge was accumulated for one day and seeded with four-day-old sludge. The agitator-aerator was run fifteen minutes an hour on the average. Samples were taken twice a week to test for bacteria count and the desired stabilization of protein and other compounds by oxidation. If more air was needed, the agitation time was increased to approximately twenty minutes out of an hour. When satisfactory stabilization was obtained, the sludge solids were pumped to a sludge bed for drying.

It is, therefore, apparent from the above that approximately four days are necessary for a given batch or mass of sludge to be stabilized by a batch process, whereas in the prior art, as mentioned hereinbefore, the necessary detention time was twenty-five to thirty-five days. In further tests, however, it has been determined the stabilization of the sludge may be accomplished in as little as two, to as long as five days depending on temperature.

It has been determined that present in the sewage mass and other waste products is a group of bacteria which is termed "B-Coli." The definition for B-Coli for the purposes of sewage treatment is as defined in the Method of Water Analysis, fifth edition, 1923, page 100, as including all non-spore forming bacilla which ferment lactose with gas formation and grow aerobically on standard solid media.

To make this a little clearer, I think I should say that these bacilla are by definition the bacilla from the colon of man and beast which are useful in digesting food. For the purposes of differentiating them from the regular aerobic bacteria which perform the stabilization in this process, the only difference is that ordinary aerobic bacteria, such as function in this process, do not form gas, whereas the B-Coli do. B-Coli, it has been discovered, are reduced about 90% in the instant process.

It has also been discovered that a fungus, or mold, is developed in the sludge which aids in the destruction of the B-Coli. Further, the fungus is a necessary part of the instant invention as it catalytically effects the process of stabilization of the sludge when unstabilized sludge is seeded with prior stabilized sludge containing a well developed growth of the fungus. The fungus naturally occurs in sewage and may be identified by its white physical characteristics, failure to live in light and cessation of development below freezing.

Two other features establishing the instant process as a substantial step forward over existing prior art process are: (1) the great ease with which product filtration and drainability is accomplished, thereby allowing layer upon layer of the material to be contained in the same sludge bed, and (2) the overcoming of undesirable foaming conditions resulting from various waste household and commercial detergents present in sewage.

Therefore, the important features obtained by the instant process are: drastic reduction in the time required for desired stabilization of the sludge; reduction in the complexity and elaborateness of equipment necessary to accomplish the desired stabilization of sludge; obviation of the necessity of hydrogen ion concentration, and temperature control; the formation of a readily drainable product; the overcoming of undesirable foaming; as well as many other important features which shall become apparent hereinafter through the development and explanation of the instant process.

The accompanying drawings are primarily diagrammatic and illustrative of how the instant invention can be put into practical use. Construction details and plans relating to building economy may be altered by those skilled in the art to suit local application without departing from the novel principles disclosed herein:

FIG. 1 is a diagrammatic flow diagram illustrative of one way the instant invention may be used in a batch process; the system provides for a clarifier, metering pump, stabilization tanks, a surge tank, and a sludge bed;

FIG. 2 is a diagrammatic flow diagram which presents exemplary illustrations of a flow sheet for a continuous method of practicing the instant invention; the continuous system is illustrated to comprise a clarifier, metering pumps, four aeration and agitation devices, a surge tank, recycle means, and a sludge bed;

FIG. 3 is an alternative batch process; and

FIG. 4 is a diagrammatic illustration of another embodiment of an aeration-agitation means which may be used.

Referring more specifically to FIG. 1, which is a diagrammatic representation of one possible batch process. Raw sewage is introduced by a pipe line 1 into a clarifier 2. Settled sludge is withdrawn by pipe line 3 and metered through pump 4 via pipe line 5 and valve 16 through one inch spaced bar screen 28 into container 32. At the same time, material is delivered through pipe line 5 and valves 17, 18 and 19 and one inch spaced bar screens 29, 30 and 31 into tanks 33, 34, 35 in a like manner. Within tanks 32, 33, 34 and 35 are located suitable aeration-agitation means 36, 37, 38 and 39 respectively.

The tanks 32, 33, 34 and 35 have an apex generally designated 43, 40, 41 and 42, respectively. In operation, this apex area contains a volume of previously stabilized sludge equal to about 2% by volume of the amount metered by pump 4 into the respective tanks 32, 33, 34 and 35.

The material introduced into the tanks 32, 33, 34 and 35 is allowed to remain for approximately four days with suitable aeration and agitation, or until such time as the desired stabilization has occurred.

Upon completion of desired stabilization, the stabilized material is withdrawn from the tanks 32, 33, 34 and 35 through valves 21, 23, 25 and 27, respectively, into line 15 and thus into the sludge bed 13 for drying. As mentioned before, upon completion of a cycle, there will be remaining in the tanks 32, 33, 34 and 35 a portion of the stabilized material in the apex area (aforementioned areas 43, 40, 41 and 42). Thereafter, more sludge is metered from clarifier 2 by pump 4 into the four tanks 32, 33, 34 and 35, for repetition of the cycle. In the base of each of the stabilization tanks is a valve 20, 22, 24 and 26, respectively, which also opens into line 15. These latter valves are for the purposes of periodic removal of gravel and other foreign matter from the tanks for disposition to suitable waste areas (not shown).

Alternatively, the apparatus of FIG. 1 may be operated as follows. Sewage 1, to be treated is fed to clarifier 2, from which it is metered or pumped by pump 4 via pipe lines 3 and 5 to a first aeration and agitation device 32, wherein is contained a volume of prior stabilized sludge in area 43; a predetermined period of time thereafter, normally about twenty-four hours, the settled sludge mass from the tank 32 is fed to a second aerator, agitator tank 33; a period of time, normally about twenty-four hours thereafter, a portion of the settled sludge mass from the second tank is fed to a third aerating and agitating tank 44 where, approximately twenty-four hours thereafter, a portion of the solid sludge mass is removed therefrom and introduced to a fourth aeration and agitation tank 35; a period of time thereafter, normally about twenty-four hours, a portion of the solid mass from the fourth aeration and agitation tank 35 is removed for delivery to a sludge bed 13 for drying.

FIG. 2 is a diagrammatic representation of one possible continuous method of utilizing the instant process. As shown in FIG. 2, sewage is introduced by line 101 into clarifier 102 wherefrom settled sludge is withdrawn via pipe line 103 and metered by pump 104 into pipe line 105 for introduction through the one inch space bar screen 106, into first tank 107 wherein is located aerator-agitator means 117 into which tank is also flowing stabilized sludge via line 116 as shall become apparent hereinafter. Commensurate with metering of pump 104 and operation of aerator-agitator means 117, flow is caused into tank 108 wherein agitator-aerator 118 is located. Further describing the drawing, after flow to tank 108, material flows into tanks 109 and 110 wherein are located additional aerator-agitator means 119 and 120. After completing the circuit through tanks 107, 108, 109 and 110, the then stabilized sludge mass is introduced to surge tank 111. The sludge material remains in tank 111 for a period of time, after which it passes through valve 112 and pump 113, which pump 113 meters a portion of the stabilized sludge via line 116 for cycling back to tank 107. The remainder of the stabilized material is passed through pump 113 into the sludge bed 114 while the separated liquid is withdrawn by pipe line 115 for suitable disposition.

FIG. 3 is representative of an alternate batch process. In FIG. 3, sewage 201 is introduced into clarifier 202 wherefrom the settled sludge is withdrawn via pipe line 203 and metered by pump 204 through pipe line 205 for flow through one inch spaced bar screen 206 into tank 207 (which has been previously seeded with prior stabilized sludge) wherein is located aerator-agitator means 211. The sludge is accumulated therein and allowed to remain in a quiescent state with agitator runs of approximately fifteen minutes per hour, on the average, for a period of twenty-four hours. At the end of one day, valves 217 and 218 are opened and pump 230 pumps the sludge from tank 207 into tank 208.

Commensurate with the removal of the sludge from tank 207, more settled sludge material is removed from clarifier 202 via pump 204 and pipe lines 203 and 205 over one inch spaced bar screen 206 into tank 207. One day after such has been accomplished, the material from tank 208 is removed to tank 209; the material then residing in 207 is removed to tank 208; and new material is introduced into 207 from clarifier 202. It is obvious from a study of the drawing that proper manipulation of valves 217, 218, 219 and 220 with pumps 230, 231 and 232, eventually accomplishes a batch of sludge material in tank 210 which is four days old, and batch of material in tank 207 which is one day old. Therefore, at the end of four days a stabilized material results in tank 210, which is removed by valve 220 and pump 227 through pipe line 226, valve 225, and pipe line 228, into sludge bed 229.

Commensurate with the removal of the four day old material from tank 210, a portion of the stabilized material is recycled into tank 207 by pump 227 and pipe line 215 through valve 221 for reintroduction into tank 207. Thus, after a start up period of four days, it will be possible each twenty-four hours to move one tank load of stabilized material into the sludge bed 229 with a small portion, about 2% by volume, thereof being reintroduced into tank 207 to reseed and catalytically effect the new material coming into tank 207. It is, of course, obvious that the aerator-agitator means 211, 212, 213 and 214 operate in the same manner, as do tanks 207, 208, 209, 210.

The valves 221, 222, 223 and 224, respectively, are the means by which stabilized sludge may be introduced into each of the four tanks if it is desirable to have four tank loads of stabilized material at the end of a four day period. This four day period of operation for the accumulation of four tank loads of stabilized sludge is accomplished by use of pumps 204, 230, 231 and 232, respectively, whereby sewage sludge is removed from clarifier 202 through the interconnecting pipe lines and pumps for filling each of the four tanks.

FIG. 4 is illustrative of the alternative agitator-aerator which may be used in the instant process. Wherein 401 is indicative of the agitator; 402 is indicative of the inflow to the agitator; element 403 is the artificial vortex forming stand pipe; and 404 is the impeller which agitates the mixture and forces the air which has descended via cylindrical passage 406 into the sludge mass; and 405 is the overflow into the next tank in the system. The use of agitator-aerators of the type herein shown has been found to be much more effective than a conventional aerator system when very viscous sludge is being processed, although other devices whereby agitation and aeration are accomplished may be used.

Also, as indicated hereinbefore, a filtering means may be used instead of surge tank 111.

Another important feature of the mechanical aerator is to thicken the sludge to the degree of thickness desired. When all of the particles of the sludge are filled with air, they become lighter than water and tend to float to the surface. The solid-free water may then be drawn off the bottom of the tank, thereby producing more concentrated sludge.

In operating the four aeration and agitation means with a vortex to continuously pull air into the sludge, the viscosity of the sludge may vary quite a bit from time to time and for this reason, it may be desirable to put a variable speed drive on the propeller.

It will be appreciated that various modifications can be made in the invention described hereinbefore without in any way deviating from the scope thereof as defined in the appended claims.

I claim:

1. In a process of stabilizing raw sewage, the steps consisting of subjecting untreated raw sewage containing "B-Coli" bacteria to quiescent settling for segregation of fluent sludge and clarified liquid, separating the raw fluent sludge so segregated, conducting the separated raw fluent sludge to a single treatment stage, introducing fluent sludge previously stabilized in the process amounting to about 2% by volume of the separated sludge into said treatment stage for mixing with said separated sludge maintained at ambient temperature to act as a catalyst therein and promote bacterial growth, subjecting the resulting fluent sludge mixture containing the catalyst to agitation and aeration in said treatment stage so as to form small discrete particles of the separated solids and remove previously oxidized matter, introducing air under pressure as an aerating media for the agitation and aeration treatment in said stage in a volume sufficient to force oxygen through the mass of discrete particles so as to promote oxidation of the protein content of the sludge, and continuing said agitation and aeration in said treatment stage until most of the "B-Coli" bacteria have been removed.

2. In a process of stabilizing raw sewage, the steps consisting of subjecting untreated raw sewage containing "B-Coli" bacteria to quiescent settling for segregation of fluent sludge and clarified liquid, separating the raw fluent sludge so segregated, conducting the separated raw fluent sludge to a single treatment stage, introducing fluent sludge previously stabilized in the process amounting to about 2% by volume of the separated sludge into said treatment stage for mixing with said separated sludge maintained at ambient temperature to act as a catalyst therein and promote bacterial growth, simultaneously subjecting the resulting fluent sludge mixture containing the catalyst to agitation and aeration in said treatment stage so as to form small discrete particles of the separated solids and remove previously oxidized matter, simultaneously introducing air under pressure as an aerating media for the agitation and aeration treatment in said stage in a volume sufficient to force oxygen through the mass of discrete particles so as to promote oxidation of the protein content of the sludge, and continuing said agitation and aeration in said treatment stage until most of the "B-Coli" bacteria have been removed.

3. In a process of stabilizing raw sewage, the steps consisting of subjecting untreated raw sewage containing "B-Coli" bacteria to quiescent settling for segregation of fluent sludge and clarified liquid, separating the raw fluent sludge so segregated, conducting the separated raw fluent sludge to a single treatment stage, introducing fluent sludge previously stabilized in the process amounting to about 2% by volume of the separated sludge into said treatment stage for mixing with said separated sludge maintained at ambient temperature to act as a catalyst therein and promote bacterial growth, subjecting the resulting fluent sludge mixture containing the catalyst to agitation and aeration in said treatment stage so as to form small discrete particles of the separated solids and remove previously oxidized matter, introducing air under pressure as an aerating media for the agitation and aeration treatment in said stage in a volume sufficient to force oxygen through the mass of discrete particles so as to promote oxidation of the protein content of the sludge, and continuing said agitation and aeration in said treatment stage for from 3–4 days and until most of the "B-Coli" bacteria have been removed.

4. In a process of stabilizing raw sewage, the steps consisting of subjecting untreated raw sewage containing "B-Coli" bacteria to quiescent settling for segregation of fluent sludge and clarified liquid, separating the raw sludge so segregated, conducting the separated raw fluent sludge to a single treatment stage, introducing fluent sludge previously stabilized in the process amounting to about 2% by volume of the separated sludge into said treatment stage for mixing with said separated sludge maintained at ambient temperature to act as a catalyst therein and promote bacterial growth, subjecting the resulting fluent sludge mixture containing the catalyst to a first agitation and aeration in said treatment stage so as to form small discrete particles of the separated solids and remove previously oxidized matter, introducing air under pressure as an aerating media for the agitation and aeration treatment in said stage in a volume sufficient to force oxygen through the mass of discrete particles so as to promote oxidation of the protein content of the sludge, passing the mass of discrete particles from said treatment through a succession of such treatments with similar air pressure introduced, and continuing said agitation and aeration until most of the "B-Coli" bacteria have been removed.

5. In a process of stabilizing raw sewage, the steps consisting of subjecting untreated raw sewage containing "B-Coli" bacteria to quiescent settling for segregation of fluent sludge and clarified liquid, separating the raw fluent sludge so segregated, conducting the separated raw fluent sludge to a single treatment stage, introducing fluent sludge previously stabilized in the process amounting to about 2% by volume of the separated sludge into said treatment stage for mixing with said separated sludge maintained at ambient temperature to act as a catalyst therein and promote bacterial growth, intermittently subjecting the resulting fluent sludge mixture containing the catalyst to agitation and aeration in said treatment stage so as to form small discrete particles of the separated solids and remove previously oxidized matter, intermittently introducing air under pressure as an aerating media for the agitation and aeration treatment in said stage in a volume sufficient to force oxygen through the mass of discrete particles so as to promote oxidation of the protein content of the sludge, and continuing said agitation and aeration in said treatment stage until most of the "B-Coli" bacteria have been removed.

6. In a process of stabilizing raw sewage, the steps consisting of subjecting untreated raw sewage containing "B-Coli" bacteria to quiescent settling for segregation of fluent sludge and clarified liquid, separating the raw fluent sludge so segregated, conducting the separated raw fluent sludge to a single treatment stage, introducing fluent sludge previously stabilized in the process amounting to about 2% by volume of the separated sludge into said treatment stage for mixing with said separated sludge maintained at ambient temperature to act as a catalyst therein and promote bacterial growth, subjecting the resulting fluent sludge mixture containing the catalyst to agitation and aeration in said treatment stage so as to form small discrete particles of the separated solids and remove previously oxidized matter, introducing air under pressure as an aerating media for the agitation and aeration treatment in said stage in a volume sufficient to force oxygen through the mass of discrete particles so as to promote oxidation of the protein content of the sludge, subjecting the resulting agitated and aerated fluent sludge containing the catalyst to agitation and aeration in a succession of treatment stages with similar air pressure introduced, continuing said agitation and aeration until most of the "B-Coli" bacteria have been removed, and returning a portion of the sludge from the last stage for mixing with the segregated sludge.

7. In a process of stabilizing raw sewage, the steps consisting of subjecting untreated raw sewage containing "B-Coli" bacteria to quiescent settling for segregation of fluent sludge and clarified liquid, separating the raw fluent sludge so segregated, conducting the separated raw fluent sludge to a single treatment stage, introducing fluent sludge previously stabilized in the process amounting to about 2% by volume of the separated sludge into said treatment stage for mixing with said separated sludge maintained at ambient temperature to act as a catalyst therein and promote bacterial growth, subjecting the resulting fluent sludge mixture containing the catalyst to agitation and aeration in said treatment stage so as to form small discrete particles of the separated solids and remove previously oxidized matter, introducing air under pressure as an aerating media for the agitation and aeration treatment in said stage in a volume sufficient to force oxygen through the mass of discrete particles so as to promote oxidation of the protein content of the sludge, continuing the aeration and agitation until oxygen is substantially exhausted by reaction with components of the sludge and escapes to the atmosphere, and discharging residual sludge containing stable protein matter and compounds to a sludge bed.

8. In a process of stabilizing raw sewage, the steps consisting of subjecting untreated raw sewage containing "B-Coli" bacteria to quiescent settling for segregation of fluent sludge and clarified liquid, separating the raw fluent sludge so segregated, conducting the separated raw fluent sludge to a single treatment stage, introducing fluent sludge previously stabilized in the process amounting to about 2% by volume of the separated sludge into said treatment stage for mixing with said separated sludge maintained at ambient temperature to act as a catalyst therein and promote bacterial growth, subjecting the resulting fluent sludge mixture containing the catalyst to agitation and aeration in said treatment stage so as to form small discrete particles of the separated solids and remove previously oxidized matter, introducing air under pressure as an aerating media for the agitation and aeration treatment in said stage in a volume sufficient to force oxygen through the mass of discrete particles so as to promote oxidation of the protein content of the sludge, continuing the aeration and agitation until a fungus forms on the material under treatment and the oxygen is substantially exhausted by reaction with components of the sludge and escapes to the atmosphere, and discharging residual sludge containing stable protein matter and compounds to a sludge bed.

References Cited in the file of this patent

UNITED STATES PATENTS

| | | |
|---|---|---|
| 1,399,561 | Imhoff et al. | Dec. 6, 1921 |
| 1,456,914 | Coombs | May 29, 1923 |
| 2,043,265 | Roeder | June 9, 1936 |
| 2,190,598 | Fischer | Feb. 13, 1940 |
| 2,209,613 | Roeder | July 30, 1940 |
| 2,430,519 | Mallory | Nov. 11, 1947 |
| 2,615,842 | Kraus | Oct. 28, 1952 |
| 2,901,114 | Smith et al. | Aug. 25, 1959 |
| 2,987,186 | Burgoon et al. | June 6, 1961 |
| 3,025,151 | Berg | Mar. 13, 1962 |

FOREIGN PATENTS

| | | |
|---|---|---|
| 1,147,414 | France | June 11, 1957 |
| 293,274 | Great Britain | July 5, 1928 |

OTHER REFERENCES

Babbitt, H. E.: "Sewerage and Sewage Treatment," 6th ed., John Wiley and Sons, Inc., New York, 1947, pages 498–501, 317–320 and 488–489. (Copy in Sci. Lib.)

"Total Oxidation of Organic Wastes," Tapleshay, Sewage and Industrial Wastes, vol. 30, May 1958, pages 652–661. (Copy in Patent Office Sci. Library.)

"Pilot Plant Investigations of Biological Sludge Treatment of Cannery and Related Wastes," Eckenfelder, Proceedings of the 7th Ind. Waste Conf., Purdue Univ., 1952, pp. 181–188. (Copy in Group 170.)